(12) United States Patent
Hirano (10) Patent No.: US 9,157,484 B2
(45) Date of Patent: Oct. 13, 2015

(54) ROTATING SHAFT AND INDUSTRIAL ROBOT EMPLOYING SAME

(71) Applicant: YAMAHA HATSUDOKI KABUSHIKI KAISHA, Shizuoka-ken (JP)

(72) Inventor: Akifumi Hirano, Shizuoka (JP)

(73) Assignee: YAMAHA HATSUDOKI KABUSHIKI KAISHA, Shizuoka-ken (JP)

( * ) Notice: Subject to any disclaimer, the term of this patent is extended or adjusted under 35 U.S.C. 154(b) by 0 days.

(21) Appl. No.: 14/043,659

(22) Filed: Oct. 1, 2013

(65) Prior Publication Data

US 2014/0096636 A1 Apr. 10, 2014

(30) Foreign Application Priority Data

Oct. 4, 2012 (JP) ................. 2012-222255

(51) Int. Cl.
*F16C 3/03* (2006.01)
*F16D 3/06* (2006.01)
(Continued)

(52) U.S. Cl.
CPC ................ *F16D 3/065* (2013.01); *F16C 3/035* (2013.01); *F16C 29/0633* (2013.01);
(Continued)

(58) Field of Classification Search
CPC .... F16C 29/00; F16C 29/0688; F16C 29/069;
F16C 29/0676; F16C 29/0619; F16C 29/065;
F16C 29/0673; F16C 29/008; F16C 29/0633;
F16C 3/03; B23Q 1/26; B25J 17/0266;
B25J 9/06; B25J 9/1065; B25J 19/0075;
B25J 9/042; B25J 9/102; B25J 17/0275;
B25J 17/0283; B25J 17/0258; B25J 18/025;
F16D 3/06; F16D 3/065

USPC ............... 74/490.01, 490.03, 490.05, 490.06;
384/7, 43, 44, 46; 464/162, 168, 180,
464/182, 183, 171, 172, 177
See application file for complete search history.

(56) References Cited

U.S. PATENT DOCUMENTS 2,983,120 A   5/1961   White
3,478,541 A   11/1969  McGill et al.
(Continued)

FOREIGN PATENT DOCUMENTS

DE   3818329 A1    12/1989
DE   10227688 A1   1/2004
(Continued)

OTHER PUBLICATIONS

An Office Action issued by the Korean Patent Office on Sep. 29, 2014, which corresponds to Korean Patent Application No. 10-2013-0118247 and is related to U.S. Appl. No. 14/043,659; with English language summary.

(Continued)

*Primary Examiner* — William C Joyce
*Assistant Examiner* — Jude Agendia
(74) *Attorney, Agent, or Firm* — Studebaker & Brackett PC (57) ABSTRACT

A rotating shaft has: a first shaft member that includes a rail member and a first connecting portion which is disposed at the rail member; and a second shaft member that includes a slider which is movably installed to the rail member, a tubular unit which is secured to the slider, and a second connecting portion which is disposed at the tubular unit. The slider includes a plurality of roller type rolling elements. The plurality of roller type rolling elements includes: first roller type rolling elements which roll along a rolling path and when torque in a first direction is inputted, transfer running torque between the slider and the rail member; and second roller type rolling elements which roll along a rolling path and when torque in a second direction, which is opposite of the first direction, is inputted, transfer running torque between the slider and the rail member.

5 Claims, 10 Drawing Sheets

(51) Int. Cl.
  *F16C 3/035* (2006.01)
  *F16C 29/06* (2006.01)
  *B25J 9/00* (2006.01)
  *B25J 17/02* (2006.01)
  *B25J 18/02* (2006.01)

(52) U.S. Cl.
  CPC ........... *F16C 29/0678* (2013.01); *B25J 9/0051* (2013.01); *B25J 17/0266* (2013.01); *B25J 18/025* (2013.01); *Y10S 901/28* (2013.01); *Y10T 74/20305* (2015.01)

(56) References Cited

U.S. PATENT DOCUMENTS

| | | | | |
|---|---|---|---|---|
| 4,968,155 | A * | 11/1990 | Bode | 384/45 |
| 5,123,754 | A * | 6/1992 | Tanaka | 384/45 |
| 5,268,970 | A * | 12/1993 | Tanaka | 384/43 |
| 6,132,093 | A | 10/2000 | Michioka et al. | |
| 6,543,987 | B2 * | 4/2003 | Ehrat | 414/735 |
| 7,029,214 | B2 * | 4/2006 | Shiba et al. | 409/241 |
| 7,188,544 | B2 * | 3/2007 | Persson et al. | 74/490.03 |
| 7,229,211 | B2 * | 6/2007 | Akiyama et al. | 384/44 |
| 8,109,171 | B2 * | 2/2012 | Nakao et al. | 74/490.03 |
| 8,113,083 | B2 * | 2/2012 | Breu | 74/490.01 |
| 8,132,481 | B2 * | 3/2012 | Nishida et al. | 74/490.01 |
| 8,714,903 | B2 * | 5/2014 | Feng | 414/735 |
| 2004/0143876 | A1 | 7/2004 | Persson et al. | |

FOREIGN PATENT DOCUMENTS

| | | |
|---|---|---|
| EP | 2301726 A1 | 3/2011 |
| JP | 2002-532269 A | 10/2002 |
| KR | 10-1036836 B1 | 5/2011 |
| WO | 00/35640 A1 | 6/2000 |

OTHER PUBLICATIONS

The extended European search report issued on Jan. 23, 2014, which corresponds to European Patent Application No. 13004620.4-1751 and is related to U.S. Appl. No. 14/043,659.

* cited by examiner

…

ROTATING SHAFT AND INDUSTRIAL ROBOT EMPLOYING SAME

BACKGROUND OF THE INVENTION

1. Field of the Invention

The present invention relates to an industrial robot using a parallel link mechanism.

2. Background Art

A known industrial robot using a parallel link mechanism (hereafter called "robot") is disclosed in Japanese Translation of PCT Application No. 2002-532269. This robot has a base unit, which is a support base, a head unit (end effector) including various tools or the like (hereafter called "tool"), and a plurality (three) of arms which respectively connect the base unit to the head unit, and the position and orientation of the head are changed by driving each arm individually in a collaborative manner using a motor installed in the base unit. This robot has a rotating shaft that is separate from the arms and that connects the motor installed in the base unit to the tool, whereby the tool can be rotary-driven by the motor. The rotating shaft is retractable, and both ends thereof are connected to the tool and the motor via a universal joint respectively. Therefore the rotating shaft can transfer the rotary driving force of the motor to the head, while following up the changes of the position and orientation of the head.

In concrete terms, the rotating shaft is configured by a cylindrical outer casing, an inner shaft, and a bushing which is secured inside the outer casing and holds the inner shaft with respect to the outer casing, so that the inner shaft can freely move in the shaft direction. In other words, the rotating shaft can be retractable by the inner shaft and the outer casing relatively displacing in the shaft direction. The inner shaft and the busing are configured by the so-called ball spline. The ball spline includes a spline shaft, a tubular unit in which the spline shaft is inserted, and a plurality of balls which is supported by the tubular unit and exists between the tubular unit and the spline shaft, and the spline shaft and the tubular unit are combined via the balls so that the spline shaft can be relatively displaced with respect to the tubular unit in the shaft direction, and the relative rotation of the spline shaft with respect to the tubular unit is constrained. In other words, in the rotating shaft, the inner shaft is constituted by the spline shaft, and the bushing is constituted by the tubular unit.

The rotating shaft which is applied to the robot according to Japanese Translation of PCT Application No. 2002-532269 has the following problems. In other words, the robot is demanded to operate at high-speed, and the arms and the rotating shaft must be light to implement the high-speed operation. However in the case of the configuration of the rotating shaft using the ball spline described above, each ball existing between the inner shaft (spline shaft) and the bushing (tubular unit) contacts the inner shaft and the bushing as point contacts. Therefore if the diameters of the inner shaft and the bushing are decreased to make the rotating shaft lighter, the contact pressure decreases since the diameter of the ball becomes smaller accordingly, which makes it difficult to transfer a desired running torque. This means that decreasing the size and the weight of the rotating shaft is difficult.

Furthermore, lubricating oil is normally supplied to the balls in order to slide the inner shaft for the bushing smoothly. But if a conventional rotating shaft is used, the inner shaft on which the lubricating oil adheres is exposed outside the outer casing when the rotating shaft is extended, which means that lubricating oil may splash. Therefore it is difficult to use the robot in a cleanroom, or to use the robot in food related application fields.

SUMMARY OF THE INVENTION

With the foregoing in view, it is an object of the present invention to decrease a size and a weight of a rotating shaft applied to an industrial robot using a parallel link mechanism.

A rotating shaft according to an aspect of the present invention is a retractable rotating shaft that is connected to a first counterpart member and a second counterpart member and transfers torque between the first and second counterpart members, the rotating shaft including: a first shaft member that includes a rail member extending in a shaft direction of the rotating shaft, and a first connecting portion which is disposed at an end of the rail member and can be connected to the first counterpart member; and a second shaft member that includes: a slider which is movably installed to the rail member; a tubular unit which extends in the shaft direction and has a first end and a second end, and of which the first end is secured to the slider so that the rail member is inserted inside the tubular unit as the slider moves toward the first connecting portion; and a second connecting portion which is disposed at the second end of the tubular unit and can be connected to the second counterpart member, wherein the slider includes: a slider main unit; and a plurality of roller type rolling elements which is held by the slider main unit, and rolls between the slider main unit and the rail member as the slider moves, and the plurality of roller type rolling elements includes: a plurality of first roller type rolling elements which rolls along a first rolling path formed in a location between the slider main unit and the rail member, and when torque to relatively rotate the first shaft member with respect to the second shaft member in a first direction is inputted to the first shaft member or the second shaft member, transfers running torque between the slider and the rail member; and a plurality of second roller type rolling elements which rolls along a second rolling path formed in a location that is between the slider main unit and the rail member and is different from the location of the first rolling path, and when torque to relatively rotate the first shaft member with respect to the second shaft member in a second direction, which is opposite of the first direction, is inputted to the first shaft member or the second shaft member, transfers running torque between the slider and the rail member.

BRIEF DESCRIPTION OF THE DRAWINGS

11B is a perspective view depicting a state where the rotating shaft and the universal joint are connected.

DETAILED DESCRIPTION OF THE PREFERRED EMBODIMENTS OF THE INVENTION

An embodiment of the present invention will now be described with reference to the accompanying drawings.

Figure 1:
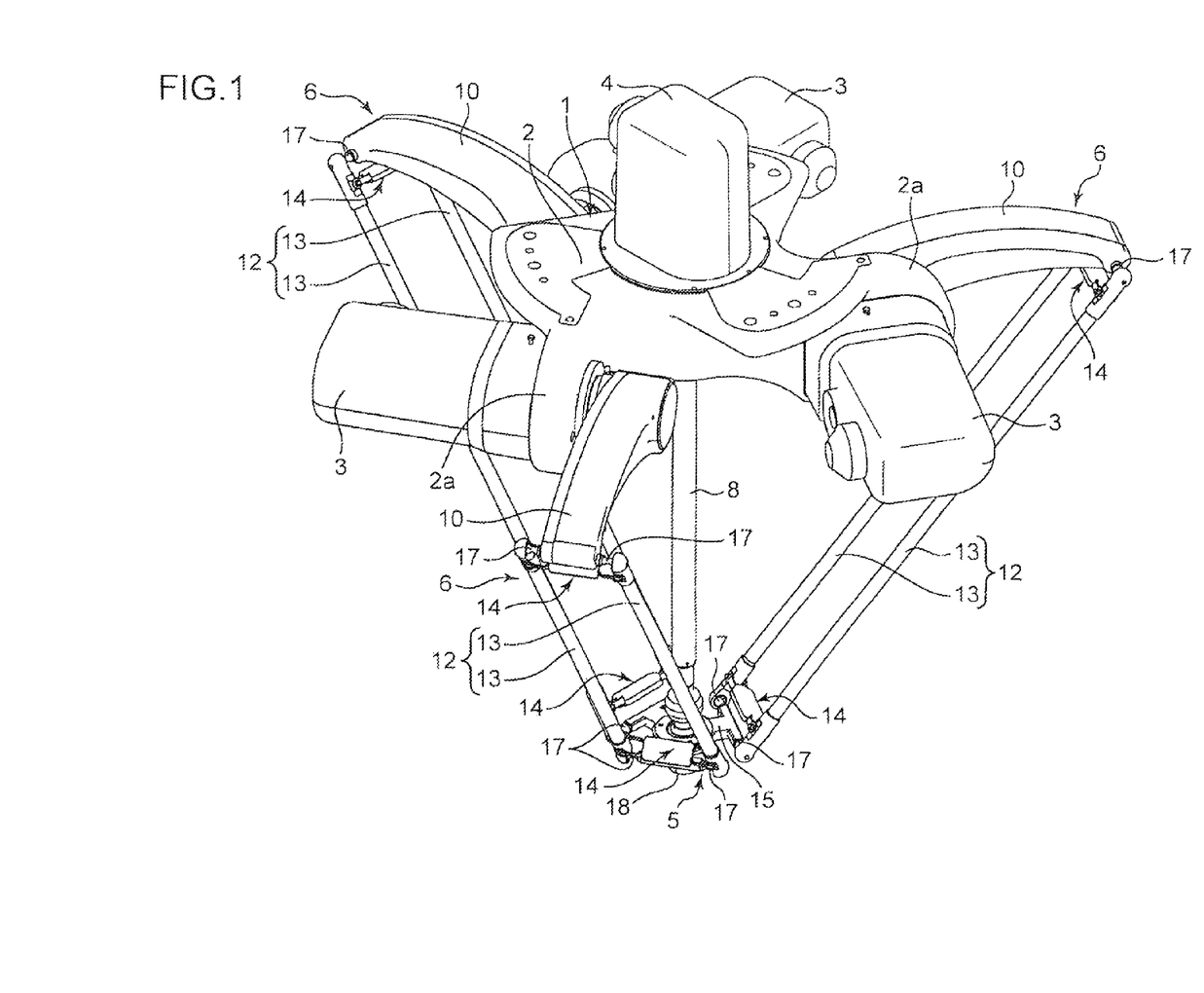
FIG. 1 is a perspective view of an industrial robot according to the present invention (industrial robot to which a rotating shaft of the present invention is applied)
Figure 2:
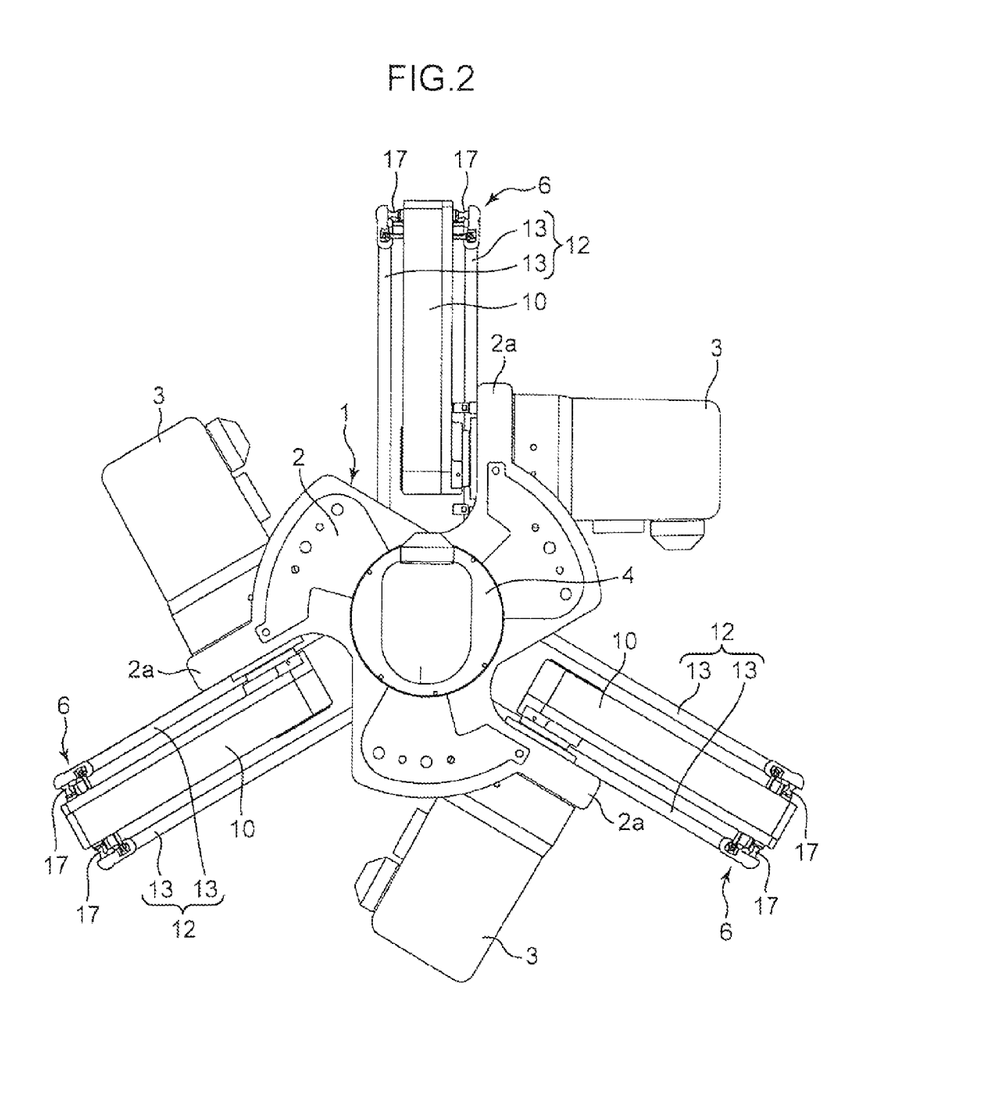
FIG. 2 is a plan view of the industrial robot.

FIG. 1 and FIG. 2 show an industrial robot according to the present invention (industrial robot to which a rotating shaft of the present invention is applied). FIG. 1 is a perspective view and FIG. 2 is a plan view each depicting the industrial robot. As FIG. 1 and FIG. 2 show, the industrial robot (hereafter called "robot") is a robot using a parallel link mechanism. The robot of this example is used for selecting an article. In other words, the robot is secured to a ceiling in a suspended state, or secured to a tower-like frame member (not illustrated) in a suspended state. Then using the suction of a later mentioned nozzle member 18, the robot picks up and selects articles which are transported by a transporting unit, such as a belt conveyor which is disposed below the robot.

The robot has a base unit 1 which is a support base secured to the ceiling or the frame member, a head unit 5 which is an end effector located below the base unit 1, and three arms 6 which connect the base unit 1 and the head unit 5 and can bend respectively, and the position and orientation of the head unit 5 can be changed by driving each arm 6 individually in a collaborative manner. The robot has a rotating shaft 8 (rotating shaft of the present invention) which vertically extends and connects the base unit 1 and the head unit 5, and as mentioned later, the rotary driving force can be transferred to a later mentioned nozzle member 18 of the head unit 5 via the rotating shaft 8.

As FIG. 1 and FIG. 2 show, the base unit 1 includes a base main unit 2, an arm driving motor 3 that drives the arm 6, and a shaft driving motor 4 that drives the rotating shaft 8.

The base main unit 2 has a substantially screw shape in a plan view, and the shaft driving motor 4 is secured at the center of the top face of the base main unit 2 in a state where the output shaft faces down.

The base main unit 2 has three motor securing portions 2a, which are disposed in the circumferential direction at equal intervals (120° interval), and extend outward. In each of the motor securing portions 2a, the arm driving motor 3 is secured sideways, in other words, in the orientation where the output shaft of the arm driving motor 3 extends horizontally, and the arm 6 is connected to the output shaft of the arm driving motor 3 respectively.

Each arm 6 is secured to the output shaft of the arm driving motor 3, and is configured by a first arm 10 which is driven around the horizontal shaft by the arm driving motor 3, and a second arm 12 which is connected between the first arm 10 and the head unit 5.

The second arm 12 includes a pair of rods 13, and a connecting member 14 which connects the rods 13 at a predetermined position in the shaft direction of the rods. Each rod 13 is connected to the first arm 10 and the head unit 5 via a ball joint 17 respectively. To be more specific, the ball joint 17 includes a ball stud assembled in the first arm 10 and the head unit 5 respectively, and a cup type socket which is assembled with each rod 13 and is connected to the ball stud so as to cover the ball head portion of the ball stud. Thereby the second arm 12 is oscillatably connected to the first arm 10 and the head unit 5, and if each first arm 10 is driven by each arm driving motor 3, each second arm 12 is bent with respect to each first arm 10, so that the position and orientation of the head unit 5 change.

Figure 3:
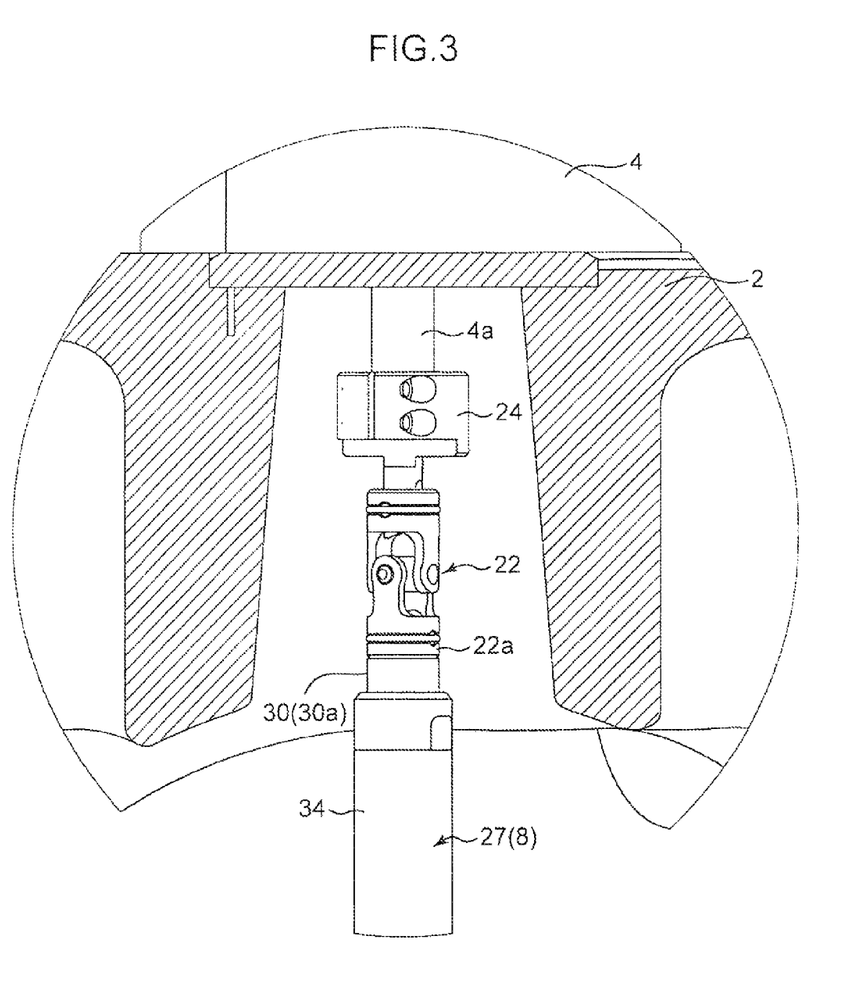
FIG. 3 is a cross-sectional view of the base unit depicting the connecting portion of a shaft-driving motor and the rotating shaft.
Figure 4:
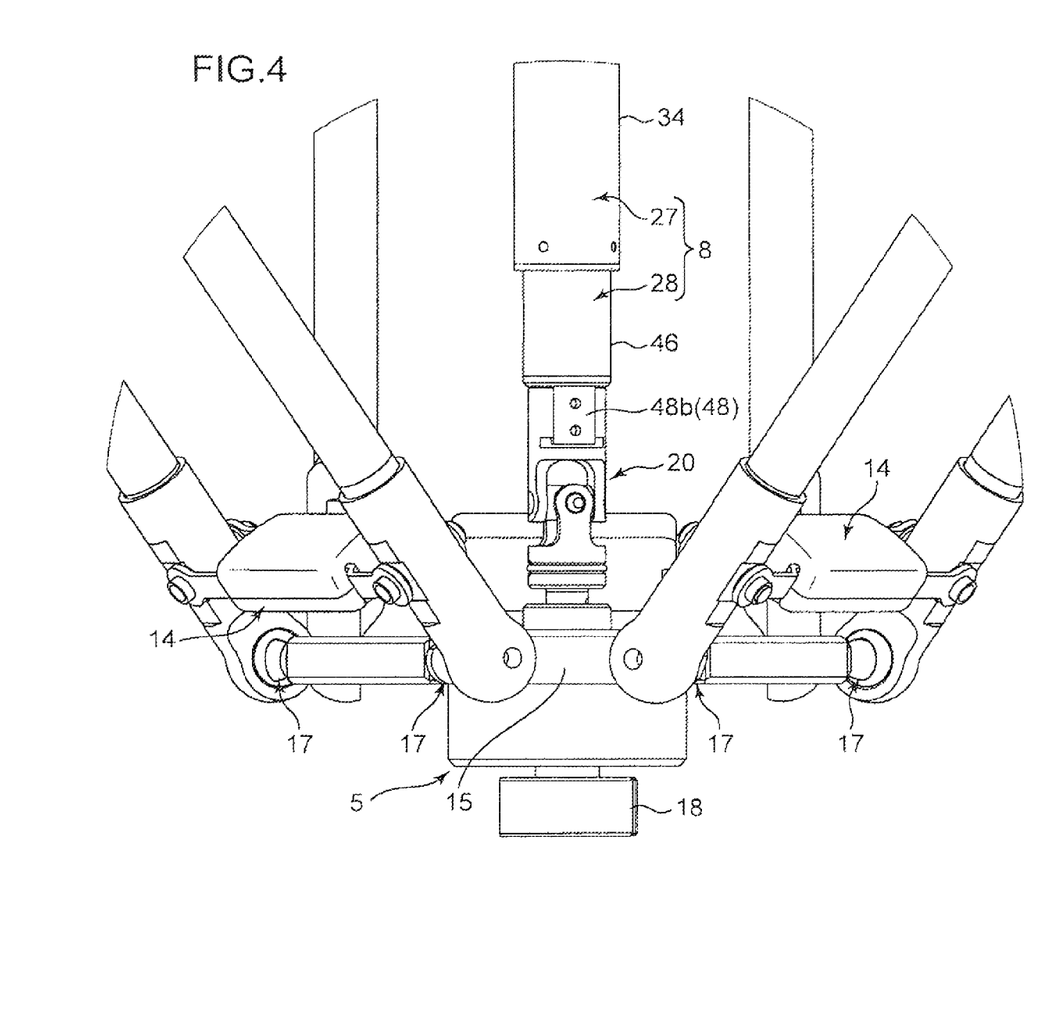
FIG. 4 is an enlarged side view depicting a head unit (end effector) of the industrial robot.

The head unit 5 includes a substantially plate type bracket 15 to which each arm 6 (second arm 12) is connected, a nozzle member 18 which uses suction to pick up articles, that is rotatably held at the center of the bracket 15 via a bearing or the like, and a universal joint 20 which is connected to the nozzle member 18. As shown in FIG. 3 and FIG. 4, the tip (lower end) of the rotating shaft 8 is connected to the upper end of the nozzle member 18 via the universal joint 20, while the base (upper end) of the rotating shaft 8 is connected to the shaft driving motor 4. The shaft driving motor 4 includes an output shaft 4a, and a coupling 24 and a universal joint 22 which are secured to the output shaft 4a, and the rotating shaft 8 is connected to the universal joint 22. By this configuration, the rotary driving force of the shaft driving motor 4 is transferred to the nozzle member 18 via the rotating shaft 8, whereby the nozzle member 18 is rotary driven. The universal joint 20 is covered by a cover member, and the universal joint 22 and the coupling 24 are also covered by a cover member, although this is not illustrated in FIG. 3 and FIG. 4.

The rotating shaft 8 is not only connected to the shaft driving motor 4 and the like via the universal joints 20 and 22, but also is extendable as described later, and is extended or retracted according to the displacement of the head unit 5. Therefore the rotary driving force can be transferred from the shaft driving motor 4 to the nozzle member 18, regardless of the position and orientation of the head unit 5.

Now a concrete configuration of the rotating shaft 8 will be described with reference to FIG. 5 to FIG. 11.

Figure 5:
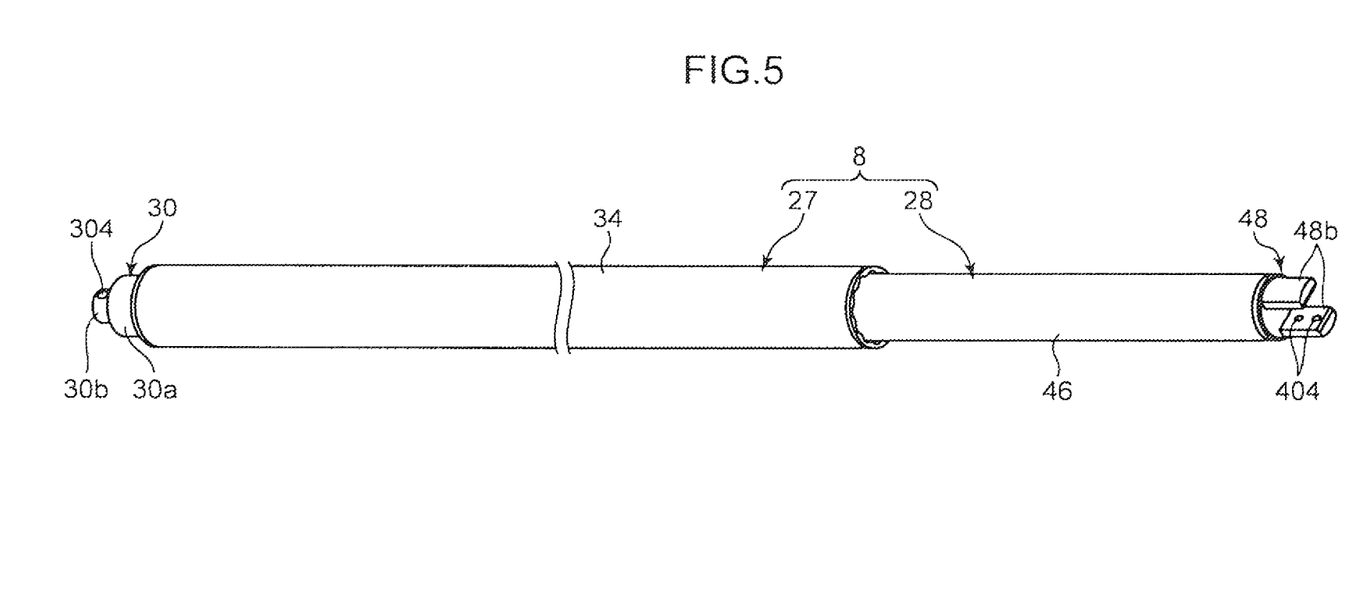
FIG. 5 is a diagram (perspective view) depicting the rotating shaft alone.
Figure 6:
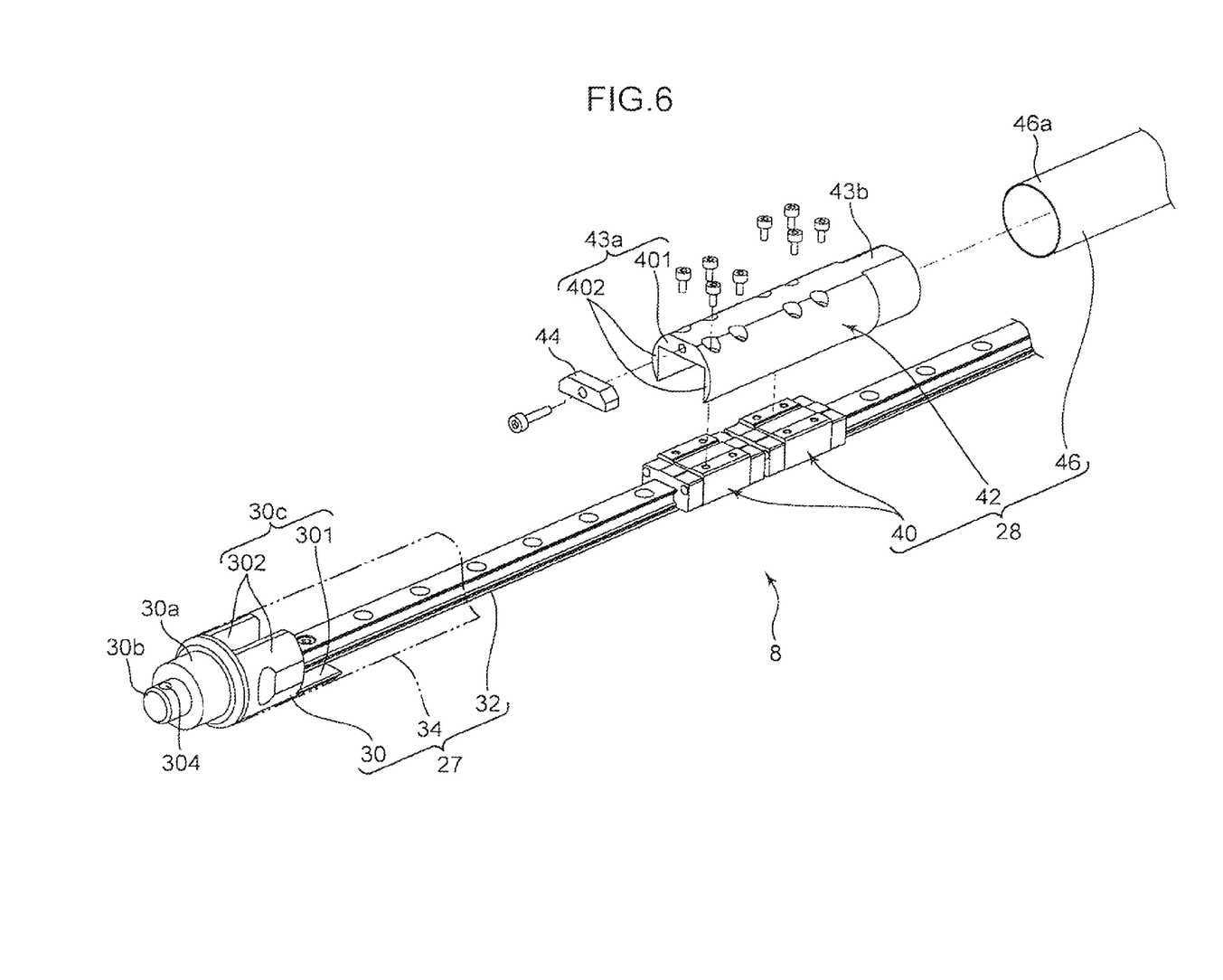
FIG. 6 is a perspective view (exploded view) of the rotating shaft.
Figure 7:
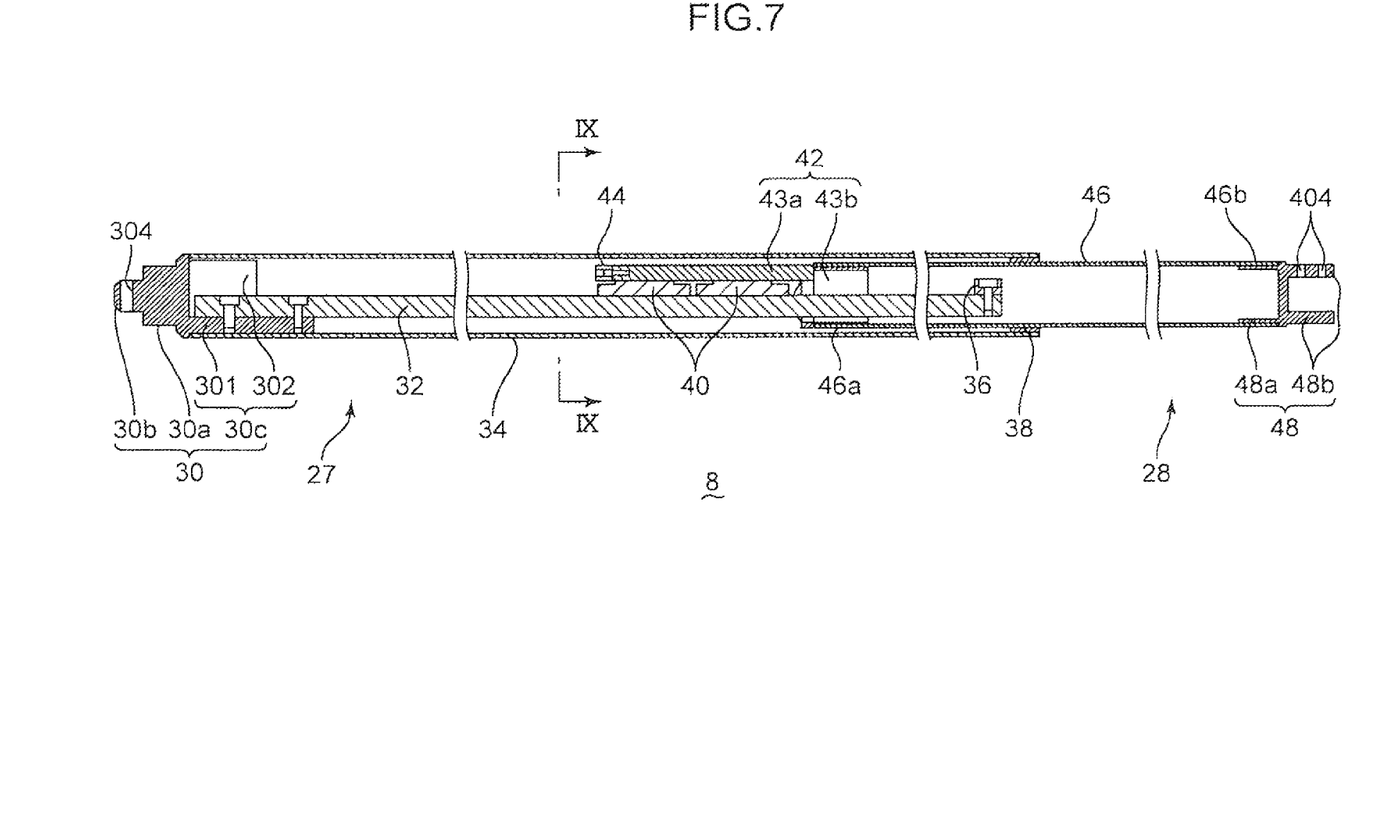
FIG. 7 is a cross-sectional view of the rotating shaft.

As FIG. 5 to FIG. 7 show, the rotating shaft 8 is configured by a first shaft member 27 and a second shaft member 28, which are connected to each other in the shaft direction.

The following description is based on the state of the rotating shaft 8 that is assembled in the robot (see FIG. 1, FIG. 3 and FIG. 4), and the left side in FIG. 5 to FIG. 7 is the upper side, and the right side in FIG. 5 to FIG. 7 is the lower side. The shaft direction of the rotating shaft 8 is simply called the "shaft direction".

The first shaft member 27 includes a rail member 32 that extends in the shaft direction, a first connecting member 30 (corresponding to the first connecting portion of the present invention) secured to the upper end portion of the rail member 32, and a first tubular unit 34 which is secured to the first connecting member 30 so as to cover the full extent of the rail member 32.

The first connecting member 30 has a cylindrical main unit portion 30a, a joint securing portion 30b which protrudes from the center of the end face of the main unit portion 30a and has a diameter smaller than that of the main unit portion 30a, and a tubular unit securing portion 30c which is connected under the main unit portion 30a, where the main unit portion 30a, the joint securing portion 30b and the tubular unit securing portion 30c are integratedly formed by a same material.

In the joint securing portion 30b, a through hole 304 is formed so as to penetrate the joint securing portion 30b in a direction perpendicular to the shaft direction, and the joint securing portion 30b is connected to the universal joint 20 through this through hole 304. This aspect will be mentioned later.

The tubular unit securing portion 30c has a groove shape in the cross-section, constituted by a base wall portion 301 and the side wall portions 302 connected to both sides of the base wall portion 301, and the external form (contour of the cross-section) is substantially a circle. As mentioned above, the rail member 32 and the first tubular unit 34 are secured to this tubular unit securing portion 30c. In concrete terms, the upper end of the rail member 32 is disposed between the two side wall portions 302 of the tubular unit securing portion 30c, and in this state, the rail member 32 is secured to the base wall portion 301 by bolts. The upper end of the first tubular unit 34 is externally fitted into the tubular unit securing portion 30c, whereby the first tubular unit 34 is secured to the tubular unit securing portion 30c in the state where the rail member 32 penetrates inside.

The second shaft member 28, on the other hand, includes two sliders 40 movably installed to the rail member 32 of the first shaft member 27, a holder 42 that holds the slider 40, a second tubular unit 46 where the upper end 46a (corresponding to the first end of the present invention) is secured to the slider 40 via the holder 42, and a second connecting member 48 (corresponding to the second connecting portion of the present invention) which is secured to a lower end 46b (corresponding to the second end of the present invention) of the second tubular unit 46. In this example, the second tubular unit 46 is indirectly secured to the slider 40 via the holder 42, but may be directly secured to the slider 40.

Figure 8:
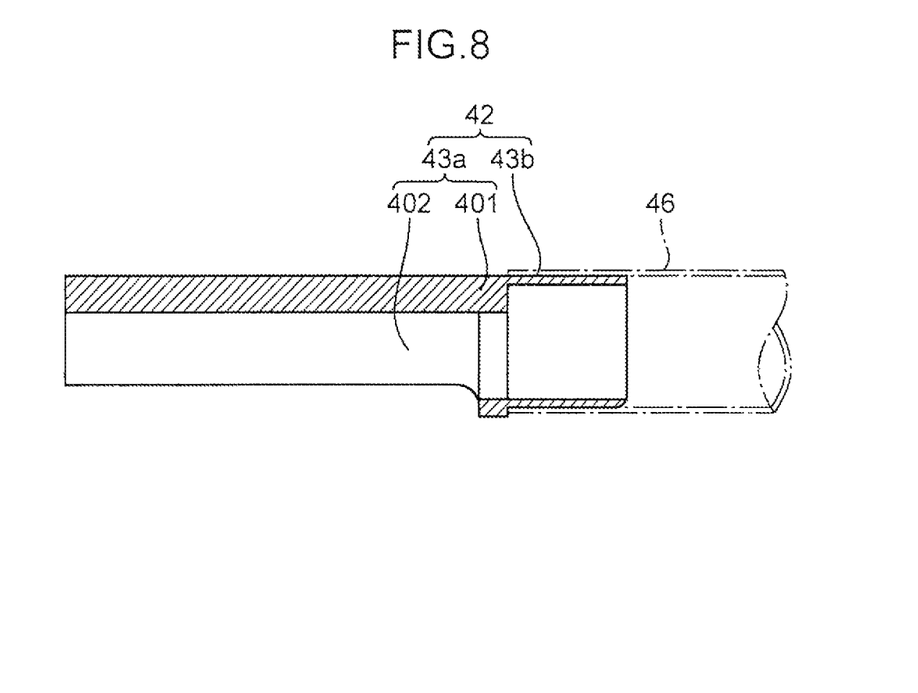
FIG. 8 is a cross-sectional view of a holder constituting a second shaft member.

The holder 42 has a main unit portion 43a for holding the slider 40 and a tubular unit securing portion 43b which is connected under the main unit portion 43a, where the main unit portion 43a and the tubular unit securing portion 43b are integratedly formed by a same material. As FIG. 6 and FIG. 8 show, the main unit portion 43a has a groove shape in the cross-section constituted by a base wall portion 401 and side wall portions 402 connected to both sides of the base wall portion 401, the external form (contour of the cross-section) is substantially a circular arc, and the tubular unit securing portion 43b is formed to be a cylinder.

As FIG. 6 and FIG. 7 show, the holder 42 is disposed to support the rail member 32, so that the rail member 32 penetrates inside the tubular unit securing portion 43b, and the base wall portion 401 is joined with the sliders 40 so that the two sliders 40 exist between the two side wall portions 402 of the main unit portion 43a. The base wall portion 401 is secured to the sliders 40 in this state by bolts, whereby the holder 42 is secured to the sliders 40. The reference numeral 44 in FIG. 6 and FIG. 7 denotes a dumper which protects the holder 42 from collision with the first connecting member 30.

The second tubular unit 46 is formed such that the outer diameter thereof is smaller than the inner diameter of the first tubular unit 34, and is secured to the tubular unit securing portion 43b of the holder 42 so that the rail member 32 penetrates inside the second tubular unit 46. In concrete terms, the second tubular unit 46 is secured to the tubular unit securing portion 43b in the state of being externally fitted into the tubular unit securing portion 43b by the tubular unit securing portion 43b that is pushed into the second tubular unit 46 from the end.

Figure 9:
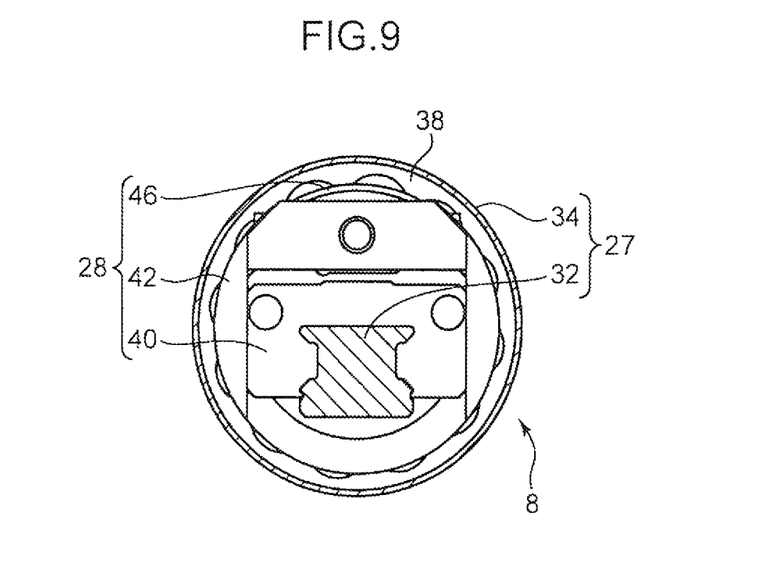
FIG. 9 is a cross-sectional view (sectioned at the IX-IX line in FIG. 7) of the rotating shaft.

The damper 36 is secured to the lower end of the rail member 32 by a bolt, so that the sliders 40 do not come out of the rail member 32. At the end of the first tubular unit 34, a spacer 38 is secured between the inner periphery of the first tubular unit 34 and the outer periphery of the second tubular unit 46. This spacer 38 is formed to intermittently contact the outer periphery of the second tubular unit 46 at equal interval in the circumferential direction, as shown in FIG. 9.

The second connecting member 48 includes a tubular unit securing portion 48a which is a cylinder with a base, a pair of joint securing portions 48b which is plates extending from the lower end of the tubular unit securing portion 48a in parallel in the shaft direction, and the tubular unit securing portion 48a and the joint securing portions 48b are integratedly formed by a same material. The second connecting member 48 is secured to the lower end of the second tubular unit 46 in a state of being inserted into the second tubular unit 46 by the tubular unit securing portion 48a that is pushed into the second tubular unit 46 from the lower end 46b.

On one side of the pair of joint securing portions 48b, a pair of through holes 404, which lines up in the shaft direction, penetrates in the thickness direction, and the second shaft member 28 is connected to the universal joint 20 using these through holes 404, as described below.

The rotating shaft 8 is assembled in the robot by the first shaft member 27 (first connecting member 30) that is connected to the shaft driving motor 4 (corresponding to the first counterpart member of the present invention) via the universal joint 22, and to the second shaft member 28 (second connecting member 48) that is connected to the nozzle member 18 (corresponding to the second counterpart member of the present invention) via the universal joint 20.

Figure 11A:
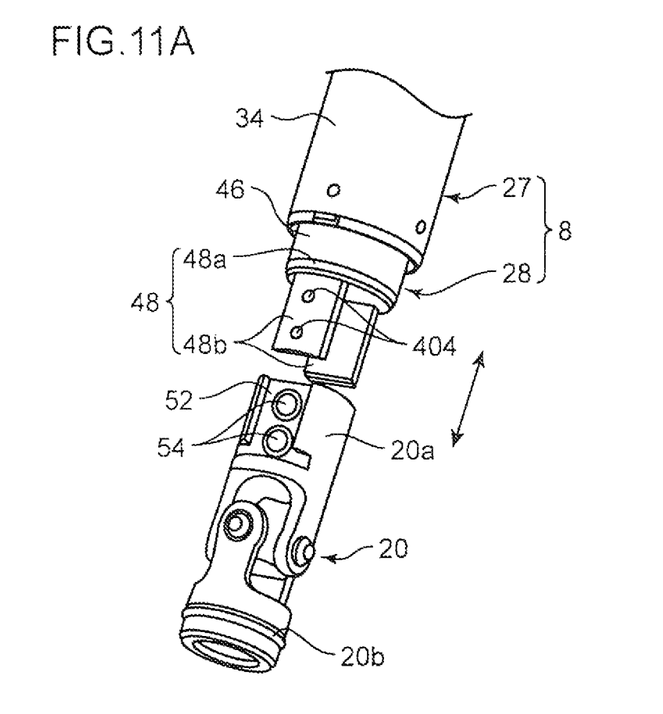
FIG. 11A is a perspective view depicting a state where the rotating shaft and a universal joint are separated, and FIG.
Figure 11B:
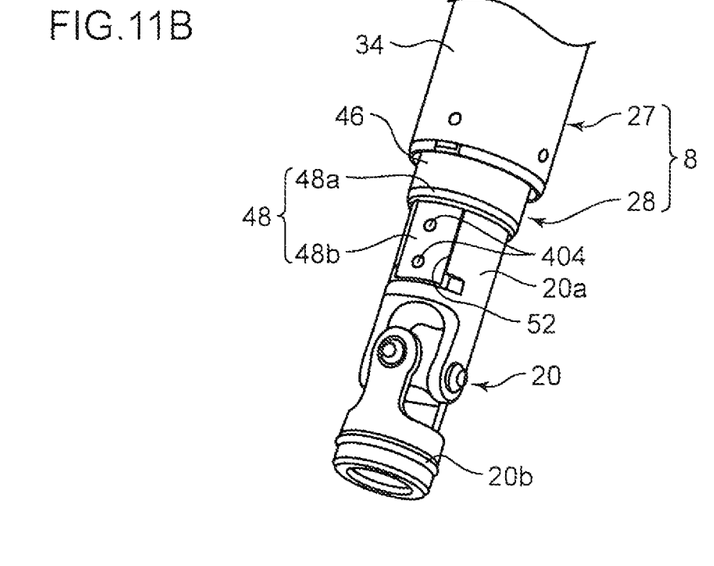

The second connecting member 48 and the universal joint 20 are connected as shown in FIG. 11A and FIG. 11B, so that the head unit 5 (nozzle member 18), along with the universal joint 20, can easily be separated from the rotating shaft 8 (second connecting member 48) during maintenance or cleaning of the head unit 5. In concrete terms, a groove 52 is formed respectively on both sides in the diameter direction of the connecting portion 20a of the universal joint 20 on the rotating shaft 8 side, as shown in FIG. 11A, so as to allow each joint securing portion 48b of the second shaft member 28 to be secured in the position. A pair of ball plungers 54 corresponding to the through holes 404 is buried in an inner base portion of one of the grooves 52. In other words, if the joint securing portions 48b of the rotating shaft 8 are inter-fitted inside each groove 52 of the connecting portion 20a along the shaft direction, a ball of each ball plunger 54 is engaged with each through hole 404 by the elastic force of a spring. Thereby the second shaft member 28 and the universal joint 20 are connected as shown in FIG. 11B. If tensile force of a predetermined value or more is applied to the rotating shaft 8 (second shaft member 28) and the universal joint 22 respectively in departing directions in this connected state, then the engaged state is released, and the rotating shaft 8 (second shaft member 28) and the universal joint 20 (connecting portion 20a) are separated. The connecting portion 20b of the universal joint 20 on the nozzle member 18 side is formed in a tubular shape. The universal joint 20 is connected to the nozzle member 18 by a shaft type connecting portion formed on the nozzle member 18 side that is inserted into the connecting portion 20b, and by those connection portions that are engaged with each other using a pin or the like.

The upper end of the rotating shaft 8, that is the first shaft member 27 (first connecting member 30), and the universal joint 22 are connected in the same manner as the connection of the nozzle member 18 and the universal joint 20. In other words, the connecting portion 22a of the universal joint 22 on the rotating shaft 8 side (see FIG. 3) is formed in a tubular shape. The universal joint 22 is connected to the upper end of the rotating shaft 8 (first shaft member 27) by the joint securing portion 30b of the first connecting member 30 that is inserted into the connecting portion 22a, and by the joint securing portion 30b and the connecting portion 22a that are engaged with each other through the through hole 304 using a pin or the like.

Figure 10:
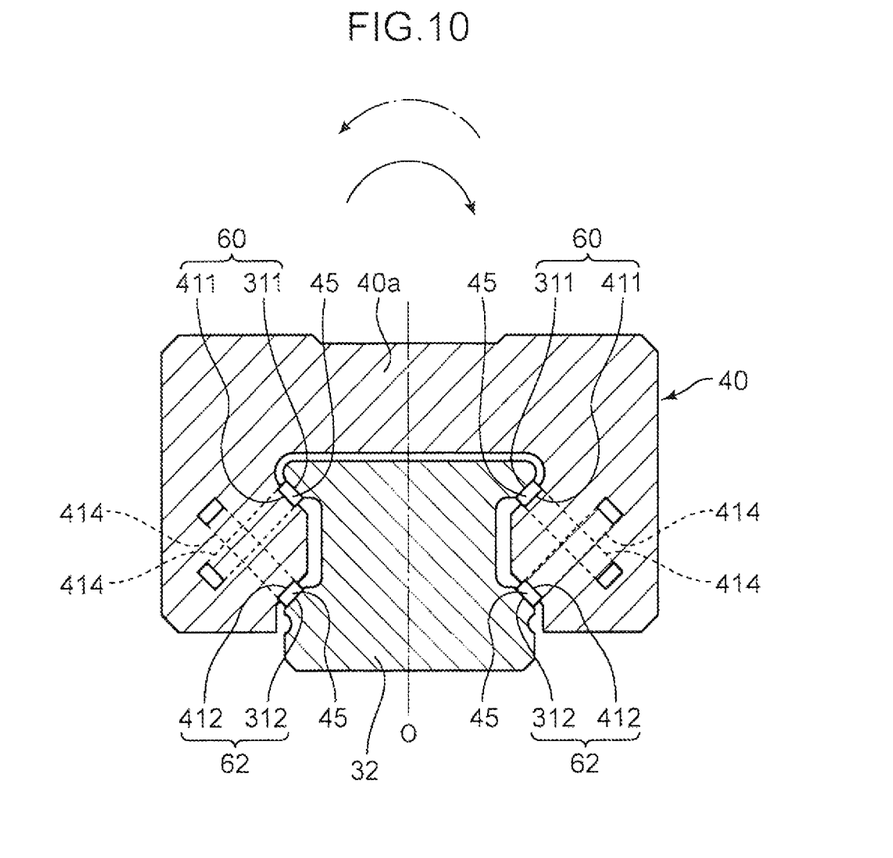
FIG. 10 is a cross-sectional view of a linear guide apparatus.

In the rotating shaft 8, the rail member 32 and the slider 40 are constituted by a linear guide apparatus. In concrete terms, as FIG. 10 shows, the rail member 32 has rolling element track surfaces 311 and 312, which extend in parallel in the longitudinal direction (shaft direction) on both side faces respectively. The rolling element track surfaces 311 and 312 on the side faces are formed to be symmetric (bilateral symmetry in FIG. 10). The slider 40 on the other hand has: a slider main unit 40*a* which includes rolling element track surfaces 411 and 412 facing the rolling element track surfaces 311 and 312 of the rail member 32 respectively; and a plurality of roller type rolling elements 45 which is supported by the slider main unit 40*a* and is positioned between the rolling element track surfaces 311 and 312 and the rolling element track surfaces 411 and 412. In other words, if the slider 40 moves along the rail member 32, each roller type rolling element 45 rolls in the longitudinal direction of the rail member 32 along the rolling path 60 constituted by the rolling element track surfaces 311 and 411, and the rolling path 62 constituted by the rolling element track surfaces 312 and 412, and rotates around a circulating path 414 formed in the slider main unit 40*a*.

The rolling element track surfaces 311 and 312 formed on one side face of the rail member 32 are inclined with respect to the center line O of the rail member 32. In this example, the rolling element track surfaces 311 and 312 are inclined at 45° respectively from the center line O in directions where the rolling element track surfaces 311 and 312 face each other (inward). Corresponding to this, the rolling element track surfaces 411 and 412 on the slider 40 side are also inclined. In other words, as FIG. 10 shows, two rolling paths 60 and 62 are formed on each left and right side of the rail member 32, and on one side of the rail member 32, and the roller type rolling element 45 that moves along one rolling path 60 and the roller type rolling element 45 moving through the other rolling path 62 are inclined respectively, so that the rotation axes of these roller type rolling elements 45 form a 90° angle.

In the rotating shaft 8 configured like this, the second shaft member 28 relatively displaces in the shaft direction with respect to the first shaft member 27 by the slider 40 moving along the rail member 32, and the entire rotating shaft 8 is extended/retracted along with the displacement. As the rotating shaft 8 is extended or retracted, the second shaft member 28 enters into or exits out of the first shaft member 27 (first tubular unit 34). In other words, the rotating shaft 8 has a telescopic structure. In this rotating shaft 8, the rail member 32 and the slider 40 are configured using the linear guide apparatus as mentioned above, hence the rotating shaft 8 can be very smoothly extended or retracted following up the change of position and orientation of the head unit 5.

Furthermore, the configuration of the rail member 32 and the slider 40 allows transferring a large running torque while keeping the sizes of the rail member 32 and the slider 40 relatively small. Therefore the size (diameter) of the rotating shaft 8 can be smaller and the weight thereof can be decreased. In other words, in the case of the rotating shaft 8, if the rotary driving force is inputted from the shaft driving motor 4 to the first shaft member 27, the running torque (turning force) is transferred from the rail member 32 to the slider 40. In the case of this rotating shaft 8, the running torque is transferred via the roller type rolling elements 45, as described above. This means that the rail member 32 and the slider main unit 40*a* are in line-contact with the rolling elements. Therefore contact pressure can be secured and a large running torque can be transferred while keeping the cross-sectional areas of the rail member 32 and the slider main unit 40*a* small. Hence, compared with a conventional rotating shaft of the same type (using a ball spline), where rolling elements point-contact the inner shaft (spline shaft) and bushing (tubular unit), a running torque equivalent to the prior art can be transferred while keeping the cross-sectional areas of the rail member 32 and the slider main unit 40*a* small. In other words, if the running torque is constant, the rotating shaft 8 can be smaller and lighter than the conventional rotating shaft of a same kind.

In the linear guide apparatus (rail member 32 and the slider 40) of the rotating shaft 8, the roller type rolling element 45 that moves along the rolling path 60 and the roller type rolling element 45 that moves along the rolling path 62 on each side of the rail member 32 are inclined toward each other, so that the rotation axes of these roller type rolling elements 45 form a 90° angle, hence torque can be transferred with certainty and appropriately from the rail member 32 to the slider 40, regardless of the direction of the torque inputted to the rotating shaft 8. In other words, if a clockwise torque (torque indicated by the solid line arrow in FIG. 10, corresponding to the torque in the first direction according to the present invention) is inputted to the rotating shaft 8 by the shaft driving motor 4 in FIG. 10, the running torque (turning force) is transferred from the rail member 32 to the slider 40 via the roller type rolling elements 45 along the lower left rolling path 62 and the upper right rolling path 60 in FIG. 10. If a counterclockwise torque (torque indicated by the dashed line arrow in FIG. 10, corresponding to the torque in the second direction according to the present invention) is inputted, on the other hand, the running torque is transferred from the rail member 32 to the slider 40 via the roller type rolling elements 45 along the upper left rolling path 60 and the lower right rolling path 62 in FIG. 10. Therefore according to this rotating shaft 8, transfer of the running torque from the first shaft member 27 to the second shaft member 28, that is, transfer of rotary driving force from the shaft driving motor 4 to the nozzle member 18, can be performed with certainty and appropriately, while decreasing the size and weight of the rotating shaft, as mentioned above. In this example, the lower left rolling path 62 and the upper right rolling path 60 in FIG. 10 correspond to the first rolling path of the present invention, and the roller type rolling elements 45 that roll along the rolling paths 60 and 62 respectively correspond to the first roller type rolling elements of the present invention. The upper left rolling path 60 and the lower right rolling path 62 correspond to the second rolling path of the present invention, and the roller type rolling elements 45 that roll along the rolling paths 60 and 62 respectively correspond to the second roller type rolling elements of the present invention.

Further, according to the rotating shaft 8, the full extend of the rail member 32 of the first shaft member 27 is covered by the first tubular unit 34, and the rail member 32 is never exposed outside regardless of the extension/retraction state of the rotating shaft 8. Therefore lubrication oil or the like, transferred from the roller type rolling elements 45 to the rail member 32, splashing outside by the extension/retraction of the rotating shaft 8 can be prevented. This means that the robot having this rotating shaft 8 can be used in a cleanroom, and is also suitably used for food related application fields.

Furthermore, the first tubular unit 34, of which the upper end is secured to the first connecting member 30 of the first shaft member 27 and the lower end contacts the second tubular unit 46 of the second shaft member 28 via the spacer 38, functions as a reinforcing member of the first shaft member 27 as well. Therefore good rigidity of the first shaft member 27 can be ensured, while configuring the rail members 32 and the sliders 40 to be relatively small, as mentioned above. Also the second shaft member 28 is supported by the first shaft member 27 at a total of two points: the position of the slider 40 and the position of the spacer 38, so the second shaft member 28 can be moved stably with respect to the first shaft member 27. In other words, the rotating shaft 8 can be stably extended/retracted.

Furthermore, the spacer 38 is formed to intermittently contact the outer periphery of the second tubular unit 46 at equal intervals in the circumferential direction, therefore while demonstrating the above functional effects, the retractability of the rotating shaft that is affected by an increase in the sliding friction between the first tubular unit 34 (spacer 38) and the second tubular unit 46 can be prevented.

The robot described above is an example of a preferred embodiment of the industrial robot according to the present invention (industrial robot to which the rotating shaft according to the present invention is applied), and a concrete configuration can be modified as necessary without departing from the spirit of the invention.

For example, the linear guide apparatus constituting the rail member 32 and the slider 40 of the rotating shaft 8 is formed such that the rail member 32 has a substantially rectangular cross-section, and the slider 40 is formed to have a U-shaped cross-section so as to hold the rail member 32 inside as shown in FIG. 10, but the cross-sectional shapes of the rail member 32 and the slider 40 are not limited to these, but may have different shapes. In this case, instead of the configuration of the roller type rolling elements 45 rolling along a total of four rolling paths 60 and 62, as in this embodiment, a configuration of the roller type rolling elements rolling along two or three rolling paths, or a configuration of the roller type rolling elements rolling along five or more rolling paths may be used.

In this embodiment, the industrial robot according to the present invention is used for picking up articles, but the industrial robot can be applied to various tasks, and is not limited to picking up articles. In other words, the head unit 5 is not limited to having the nozzle member 18 for suction of an article, as mentioned above, but may have another operating member that performs this task.

In this embodiment, the rotary driving force is inputted to the first shaft member 27 of the rotating shaft 8, but the rotary driving force may be inputted to the second shaft member.

The present invention described above is summarized as follows.

A rotating shaft according to an aspect of the present invention is a retractable rotating shaft that is connected to a first counterpart member and a second counterpart member and transfers torque between the first and second counterpart members, the rotating shaft including: a first shaft member that includes a rail member extending in a shaft direction of the rotating shaft, and a first connecting portion which is disposed at an end of the rail member and can be connected to the first counterpart member; and a second shaft member that includes: a slider which is movably installed to the rail member; a tubular unit which extends in the shaft direction and has a first end and a second end, and of which the first end is secured to the slider so that the rail member is inserted inside the tubular unit as the slider moves toward the first connecting portion; and a second connecting portion which is disposed at the second end of the tubular unit and can be connected to the second counterpart member, wherein the slider includes: a slider main unit; and a plurality of roller type rolling elements which is held by the slider main unit, and rolls between the slider main unit and the rail member as the slider moves, and the plurality of roller type rolling elements includes: a plurality of first roller type rolling elements which rolls along a first rolling path formed in a location between the slider main unit and the rail member, and when torque to relatively rotate the first shaft member with respect to the second shaft member in a first direction is inputted to the first shaft member or the second shaft member, transfers running torque between the slider and the rail member; and a plurality of second roller type rolling elements which rolls along a second rolling path formed in a location that is between the slider main unit and the rail member and is different from the location of the first rolling path, and when torque to relatively rotate the first shaft member with respect to the second shaft member in a second direction, which is opposite of the first direction, is inputted to the first shaft member or the second shaft member, transfers running torque between the slider and the rail member.

In this rotating shaft, the slider moves along the rail member, whereby the first shaft member and the second shaft member relatively displace in the shaft directions thereof, and the entire rotating shaft is extended or retracted by the displacement. According to this rotating shaft, if a torque in the first direction is inputted to the rotating shaft, the running torque (turning force) is transferred between the slider and the rail member via the first roller type rolling element that rolls along the first rolling path. If a torque in the opposite direction (second direction) is inputted to the rotating shaft, on the other hand, the running torque is transferred between the slider and the rail member via the second roller type rolling element that rolls along the second rolling path. Therefore in whatever direction of the first direction and the second direction the torque is inputted to the rotating shaft, the running torque is transferred well between the rail member and the slider, that is, between the first shaft member and the second shaft member. Further, according to this rotating shaft, the running torque is transferred to the roller type rolling elements, as mentioned above, in other words, the rail member and the slider main unit are in line-contact with the rolling elements, therefore contact pressure can be secured, and a large running torque can be transferred while keeping the cross-sectional areas of the rail member and the slider small. Hence compared with a conventional rotating shaft of a same kind (using a ball spline), where rolling elements point-contact the inner shaft (spline shaft) and the bushing (tubular unit), the running torque (turning force) equivalent to the prior art can be transferred while keeping the cross-sectional areas of the rail member and the slider small. In other words, if the running torque is constant, the rotating shaft can be smaller and lighter than the conventional rotating shaft of a same kind.

In this rotating shaft, it is preferable that a plurality of the first rolling paths and a plurality of the second rolling paths are formed between the rail member and the slider main unit, so that the first roller type rolling element and the second roller type rolling element are alternately disposed in the circumferential direction of the rail member when viewed in a cross-section perpendicular to the longitudinal direction of the rail member.

According to this configuration, the rotating shaft can be extended or retracted more smoothly and stably, and greater running torque can be transferred between the rail member and the slider, that is, between the first shaft member and the second shaft member.

In this rotating shaft, it is preferable that the first shaft member further includes a tubular unit which is secured to the first connecting portion and extends in the shaft direction, and covers the full extent of the rail member, and when this tubular unit is defined as a first tubular unit and the tubular unit of the second shaft member is defined as a second tubular unit, the first tubular unit has an inner diameter larger than the outer diameter of the second tubular unit, so that the second tubular unit is inserted into the first tubular unit as the slider moves.

According to this configuration, exposure of the rail member to the outside is prevented. Therefore a foreign substance (lubrication oil, sliding powder) adhering to the rail member, for example, splashing outside as the rotating shaft is extended or retracted can be prevented.

In this case, it is preferable that the first tubular unit has a spacer which exists between the first tubular unit and the second tubular unit, and the spacer has a shape to intermittently contact the outer periphery of the second tubular unit in the circumferential direction.

According to this configuration, the total rigidity of the rotating shaft can be increased since the second shaft member (second tubular unit) is supported by the first shaft member (first tubular unit) from the outside in a diameter direction. Further, the spacer has a shape to intermittently contact the outer periphery of the second tubular unit in the circumferential direction, therefore the retractability of the rotating shaft being affected by an increase in the sliding friction between the first tubular unit (spacer) and the second tubular unit can be prevented.

An industrial robot according to an aspect of the present invention is an industrial robot using a parallel link mechanism, the robot including: a base unit; an end effector; a plurality of arms that connects the base unit and the end effector; a rotating shaft that connects the base unit and the end effector; and a motor that is installed in the base unit and applies rotary-driving force to the end effector by driving the rotating shaft, wherein the rotating shaft is any one of the rotating shafts described above, and is connected to the motor and the end effector via a universal joint respectively, regarding one of the motor and the end effector as the first counterpart member, and the other as the second counterpart member.

According to this industrial robot which has the rotating shaft described above, the operation speed can be increased by making the rotating shaft of the industrial robot lighter.

INDUSTRIAL APPLICABILITY

As described above, the present invention allows decreasing the size and weight of the rotating shaft applied to an industrial robot using a parallel link mechanism, whereby the operation speed of the industrial robot is increased. Therefore the present invention contributes to an increase in the efficiency of various operations using the industrial robot.

This application is based on Japanese Patent application No. 2012-222255 filed in Japan Patent Office on Oct. 4, 2012, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A retractable rotating shaft that is connected to a first counterpart member and a second counterpart member and transfers torque between the first and second counterpart members, the rotating shaft comprising:
a first shaft member that includes a rail member having a rectangular shape in a cross section and extending in a shaft direction of the rotating shaft, and a first connecting portion which is disposed at an end of the rail member and can be connected to the first counterpart member; and
a second shaft member that includes: a slider having a U-shape to hold the rail member and movably installed to the rail member; a holder which holds the slider; a tubular unit which extends in the shaft direction and has a first end and a second end, and of which the first end is secured to the holder so that the rail member is inserted inside the tubular unit as the slider moves toward the first connecting portion; and a second connecting portion which is disposed at the second end of the tubular unit and can be connected to the second counterpart member, wherein
the slider includes: a slider main unit to which the holder is fixedly attached; and a plurality of rolling elements which is held by the slider main unit, and rolls between the slider main unit and the rail member as the slider moves,
the holder includes: a main unit portion having a U-shape in a cross section to hold the slider; and a tubular unit securing portion extending from an end of the main unit portion to receive the rail member inside, the tubular unit securing portion being engaged in the tubular unit to connect the tubular unit to the slider via the holder, and
plurality of rolling elements includes: a plurality of first rolling elements which rolls along a first rolling path formed in a location between the slider main unit and the rail member, and when torque to relatively rotate the first shaft member with respect to the second shaft member in a first direction is inputted to the first shaft member or the second shaft member, transfers running torque between the slider and the rail member; and a plurality of second rolling elements which rolls along a second rolling path formed in a location that is between the slider main unit and the rail member and is different from the location of the first rolling path, and when torque to relatively rotate the first shaft member with respect to the second shaft member in a second direction, which is opposite of the first direction, is inputted to the first shaft member or the second shaft member, transfers running torque between the slider and the rail member.

2. The rotating shaft according to claim 1, wherein a plurality of the first rolling paths and a plurality of the second rolling paths are formed between the rail member and the slider main unit, so that the first rolling element and the second rolling element are alternately disposed in the circumferential direction of the rail member when viewed in a cross-section perpendicular to the longitudinal direction of the rail member.

3. The rotating shaft according to claim 1, wherein the first shaft member further includes a tubular unit which is secured to the first connecting portion and extends in the shaft direction, and covers the full extent of the rail member, and
when this tubular unit is defined as a first tubular unit and the tubular unit of the second shaft member is defined as a second tubular unit, the first tubular unit has an inner diameter larger than the outer diameter of the second tubular unit, so that the second tubular unit is inserted into the first tubular unit as the slider moves.

4. The rotating shaft according to claim 3, wherein the first tubular unit has a spacer which exists between the first tubular unit and the second tubular unit, and
the spacer has a shape to intermittently contact the outer periphery of the second tubular unit in the circumferential direction.

5. An industrial robot using a parallel link mechanism, the robot comprising:
a base unit; an end effector; a plurality of arms that connects the base unit and the end effector; a rotating shaft that connects the base unit and the end effector; and a motor that is installed in the base unit and applies rotary-driving force to the end effector by driving the rotating shaft, wherein
the rotating shaft is the rotating shaft according to claim 1, and is connected to the motor and the end effector, regarding one of the motor and the end effector as the first counterpart member, and the other as the second counterpart member.

* * * * *